United States Patent
Miyakoshi

(10) Patent No.: US 10,389,898 B2
(45) Date of Patent: Aug. 20, 2019

(54) SENSOR MOUNTING STRUCTURE, FIXING DEVICE, AND IMAGE FORMING APPARATUS THEREWITH

(71) Applicant: KYOCERA Document Solutions Inc., Osaka (JP)

(72) Inventor: Naoto Miyakoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/865,696

(22) Filed: Jan. 9, 2018

(65) Prior Publication Data
US 2018/0198934 A1 Jul. 12, 2018

(30) Foreign Application Priority Data
Jan. 12, 2017 (JP) .................. 2017-003167

(51) Int. Cl.
| | |
|---|---|
| *H04N 1/00* | (2006.01) |
| *H04N 1/12* | (2006.01) |
| *G03G 15/20* | (2006.01) |
| *G03G 15/16* | (2006.01) |
| *G03G 21/16* | (2006.01) |

(52) U.S. Cl.
CPC ....... *H04N 1/00538* (2013.01); *G03G 15/163* (2013.01); *G03G 15/2039* (2013.01); *G03G 21/1685* (2013.01); *H04N 1/125* (2013.01); *H04N 1/1215* (2013.01); *H04N 1/1225* (2013.01); *G03G 21/1652* (2013.01); *H04N 2201/0448* (2013.01)

(58) Field of Classification Search
None
See application file for complete search history.

(56) References Cited

U.S. PATENT DOCUMENTS

| | | | | |
|---|---|---|---|---|
| 2014/0233995 A1* | 8/2014 | Kasuya | ............. | G03G 15/2053 399/329 |
| 2015/0205236 A1* | 7/2015 | Saito | ................. | G03G 15/2039 399/69 |
| 2016/0338198 A1* | 11/2016 | Ohsawa | ............. | H03K 17/9622 |

FOREIGN PATENT DOCUMENTS

JP H04-069527 A 3/1992

* cited by examiner

*Primary Examiner* — Frantz Bataille
(74) *Attorney, Agent, or Firm* — Studebaker & Brackett PC

(57) ABSTRACT

A sensor mounting structure includes a positioning member, a holding member, and a biasing member. The positioning member is a mounting reference of a sensor. The holding member is attachable to and detachable from the positioning member so as to form a space in which the sensor is disposed with respect to the positioning member. The biasing member includes an arched part which is overhung between a pair of engaging parts engaging with the holding member. The biasing member, while the holding member is attached to the positioning member, elastically deforms the arched part that is sandwiched between the holding member and the sensor that is disposed in the space so as to bias the sensor to the positioning member.

12 Claims, 16 Drawing Sheets

SENSOR MOUNTING STRUCTURE, FIXING DEVICE, AND IMAGE FORMING APPARATUS THEREWITH

INCORPORATION BY REFERENCE

This application is based on and claims the benefit of priority from Japanese Patent application No. 2017-003167 filed on Jan. 12, 2017, the entire contents of which are incorporated herein by reference.

The present disclosure relates to a sensor mounting structure, a fixing device, and an image forming apparatus therewith.

In an electronic device such as an image forming apparatus, a variety of sensors to detect a device state or the like are provided.

For example, there is proposed a structure of mounting an optical measuring sensor to an optical device via a plate spring obtained by continuously forming two left and right bent part to each other in a substantial S-shape. A bent part at the right side of the plate spring sandwiches a sensor holder, a visual sensitivity filter, and an optical measuring sensor. A bent part at the left side of the plate spring is fixed to be inserted into a main body mounting part. In this structure, the sensor holder that has held the visual sensitivity filter and the optical measuring sensor thereon is pressed against the main body mounting part by a biasing force (spring pressure) of the plate spring.

SUMMARY

In accordance with an aspect of the present disclosure, a sensor mounting structure includes a positioning member, a holding member, and a biasing member. The positioning member is a mounting reference of a sensor. The holding member is attachable to and detachable from the positioning member so as to form a space in which the sensor is disposed with respect to the positioning member. The biasing member includes an arched part which is overhung between a pair of engaging parts engaging with the holding member. The biasing member, while the holding member is attached to the positioning member, elastically deforms the arched part that is sandwiched between the holding member and the sensor that is disposed in the space so as to bias the sensor to the positioning member.

In accordance with an aspect of the present disclosure, a fixing device includes a fixing member, a pressing member, and the sensor mounting structure. The fixing member heats, while rotating, a toner image on a medium. The pressing member forms, while rotating, a nip with respect to the fixing member and then presses the medium passing through the nip. The sensor mounting structure mounts the sensor configured to detect a temperature of the fixing member.

In accordance with an aspect of the present disclosure, an image forming apparatus includes the fixing device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to accompanying figures, embodiments of the present disclosure will be described. A near side of figures such as FIG. 1 will be set as a front side. Arrows Fr, Rr, L, R, U, and D shown in the figures indicate a front side, a rear side, a left side, a right side, an upside, and a downside, respectively.

First Embodiment

Entire Configuration of Color Printer

Figure 1:
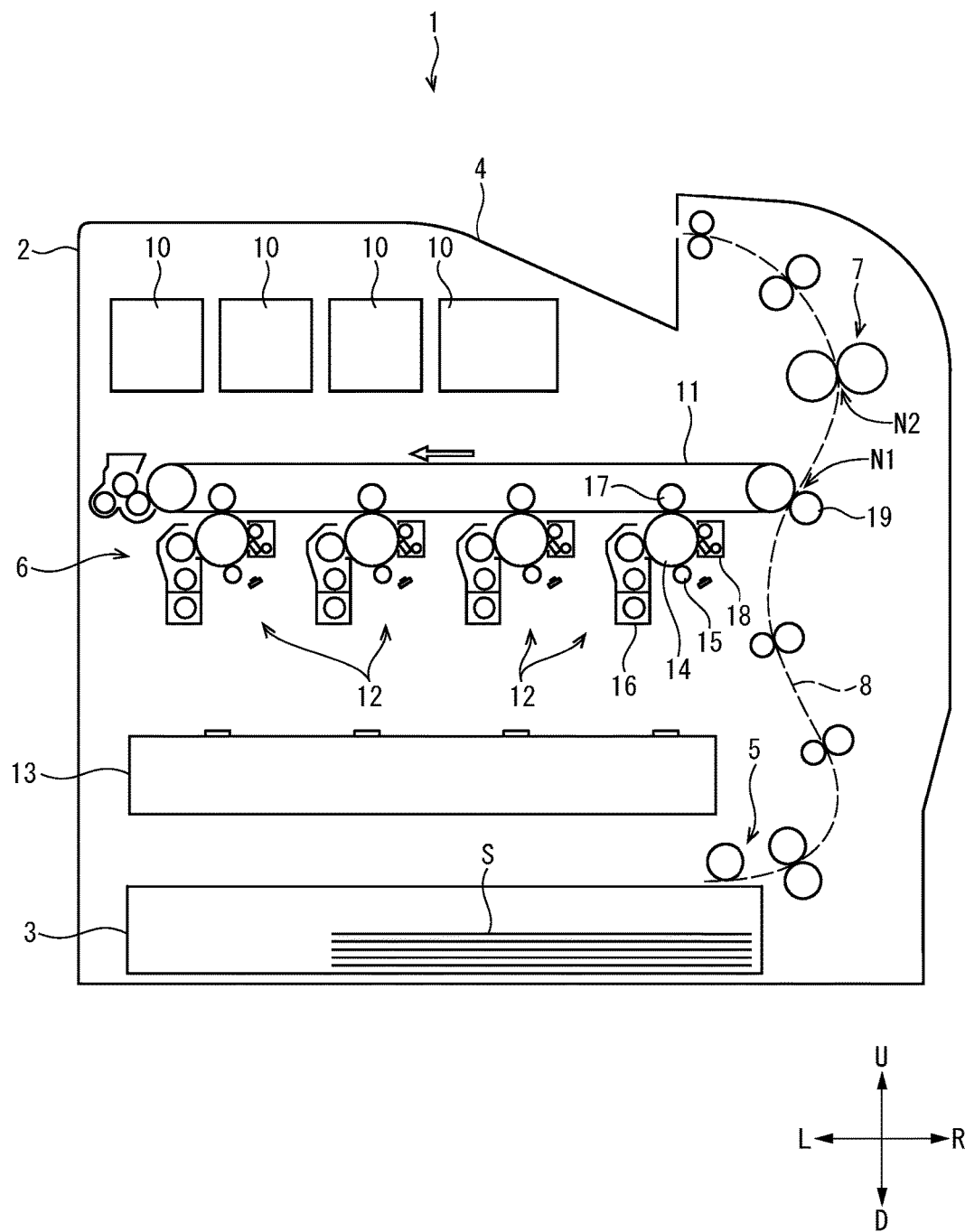
FIG. 1 is a sectional view schematically showing an internal structure of a color printer according to a first embodiment of the present disclosure.

With reference to FIG. 1, an entire configuration of a color printer 1 as an example of an image forming apparatus will be described. FIG. 1 is a sectional view schematically showing an internal structure of the color printer 1.

The color printer 1 includes a main body 2 configurating a substantially rectangular parallelepiped-shaped appearance. In a lower part of the main body 2, a sheet feeding cartridge 3 storing (a stack of) paper sheets S is attachably and detachably provided. In an upper surface of the main body 2, an ejected sheet tray 4 is provided. The sheet S, which is an example of a medium, is not limited to the paper sheet and can be a resin sheet or the like.

The color printer 1 includes a sheet feeding device 5, an imaging device 6, and a fixing device 7 in the main body 2. The sheet feeding device 5 is provided at an upstream end of a conveying path 8 extending from the sheet feeding cartridge 3 to the ejected sheet tray 4. The fixing device 7 is provided at a downstream side of the conveying path 8, and the imaging device 6 is provided on the conveying path 8 and between the sheet feeding device 5 and the fixing device 7.

The imaging device 6 includes four toner containers 10, an intermediate transferring belt 11, four drum units 12, and an optical scanning device 13. The four toner containers 10 respectively store four colors (yellow, magenta, cyan, and black) of toners (developers). The intermediate transferring belt 11 rotates in a counterclockwise direction of FIG. 1. Each drum unit 12 includes a photosensitive drum 14, a charger 15, a development device 16, a first transfer roller 17, and a cleaning device 18. Each first transfer roller 17 is provided so as to interpose the intermediate transfer belt 11 between the first transfer roller 17 itself and the corresponding photosensitive drum 14. A second transfer roller 19 is in contact with a right side of the intermediate transfer belt 11 so as to form a transferring nip N1.

The color printer 1 forms an image on a sheet S according to following procedures. Each charger 15 charges a surface of the corresponding photosensitive drum 14. Each photosensitive drum 14 receives a scanning light emitted from the optical scanning device 13 and carries an electrostatic latent image. Each development device 16 develops the corresponding electrostatic latent image to forma toner image using the toner supplied from the corresponding toner container 10. Each first transfer roller 17 primarily transfers the corresponding toner image on the corresponding photosensitive drum 14 to the rotating intermediate transfer belt 11. The intermediate transfer belt 11, while rotating, carries a full-color toner image in which the four-colored toner images are overlapped. The sheet S is fed out by the sheet feeding device 5 from the sheet feeding cartridge 3 to the conveying path 8. The second transfer roller 19 secondarily transfers the toner image having been formed on the intermediate transfer belt 11 to the sheet S passing through the transferring nip N1. The fixing device 7 thermally fixes the toner image on the sheet S. Afterward, the sheet S is ejected to the ejected sheet tray 4. Each cleaning device 18 removes the toner remaining on the corresponding photosensitive drum 14.

<Fixing Device>

Figure 2:
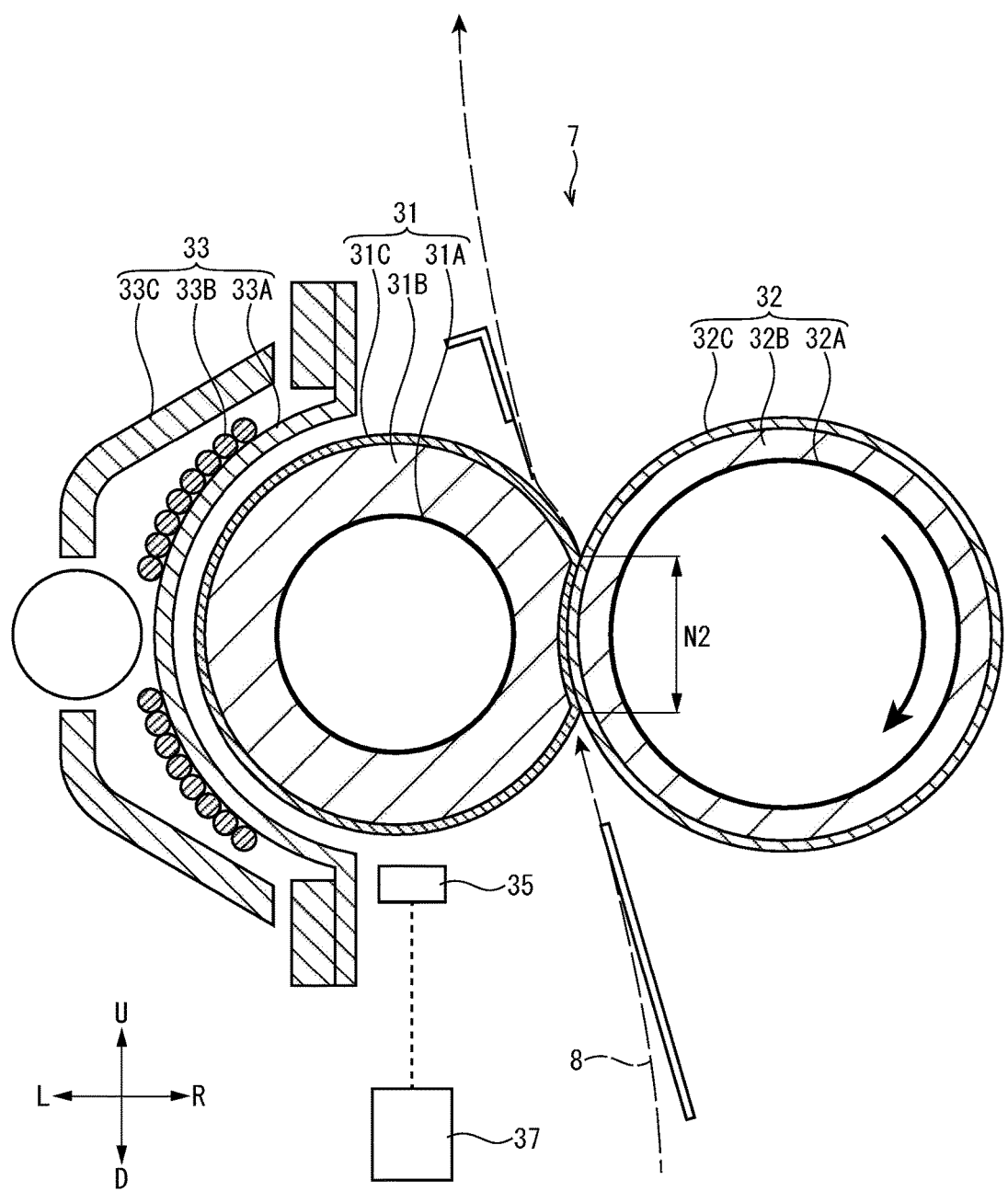
FIG. 2 is a sectional view schematically showing a fixing device according to the first embodiment of the present disclosure.
Figure 3:
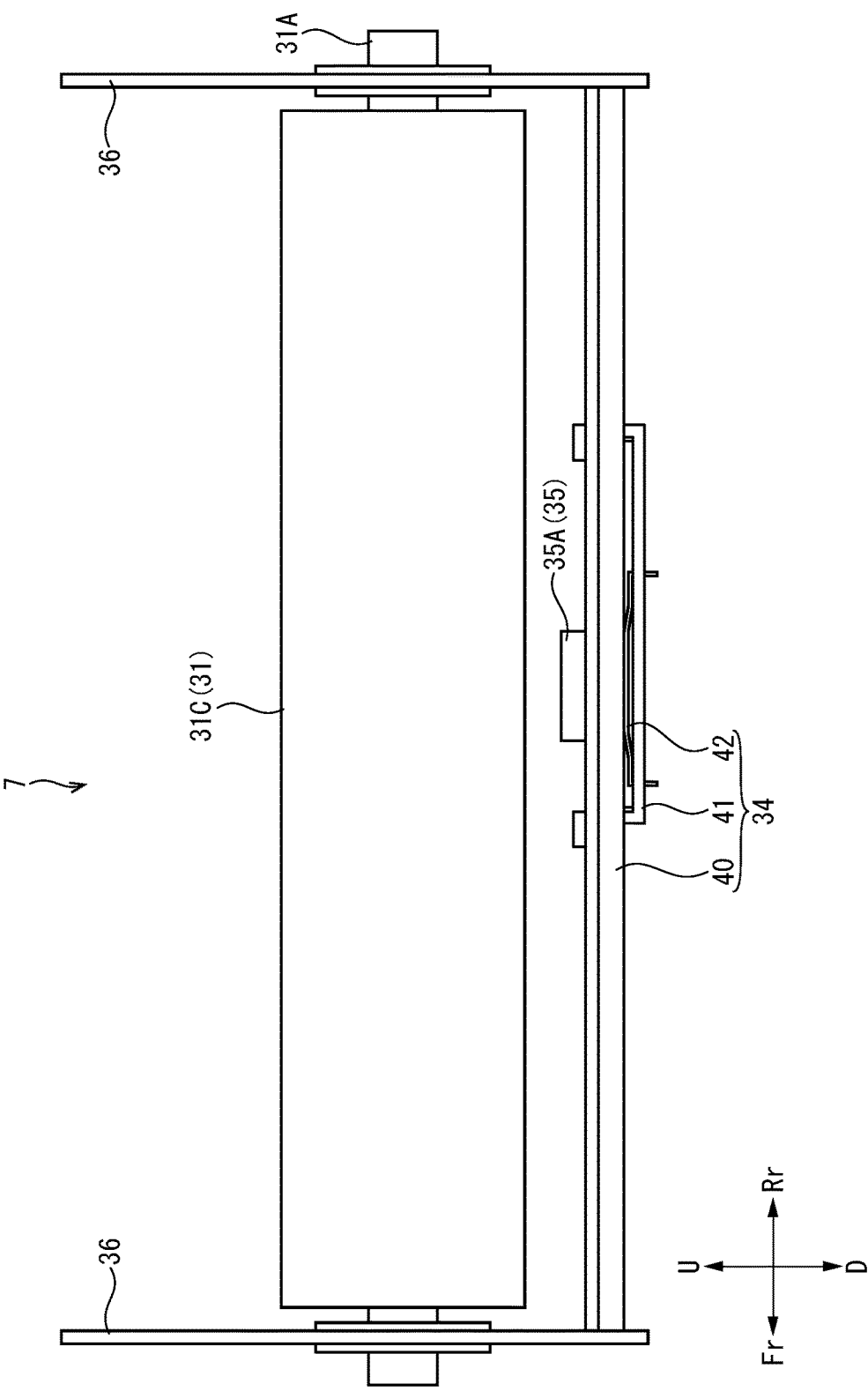
FIG. 3 is a sectional view schematically showing a fixing roller and a sensor mounting structure of the fixing device according to the first embodiment of the present disclosure.

With reference to FIG. 2 and FIG. 3, the fixing device 7 will be described. FIG. 2 is a sectional view schematically showing the fixing device 7. FIG. 3 is a sectional view schematically showing a fixing roller 31 and a sensor mounting structure 34 of the fixing device 7.

As shown in FIG. 2 and FIG. 3, the fixing device 7 includes a fixing roller 31, a pressing roller 32, a heating unit 33, and the sensor mounting structure 34. The fixing roller 31 and the pressing roller 32 are cylindrical members which are elongated in a longitudinal direction (axial direction), respectively. The heating unit 33 is a device for heating the fixing roller 31. The sensor mounting structure 34 is a structure for mounting a temperature sensor 35 which detects a temperature of the fixing roller 31.

As shown in FIG. 2, the fixing roller 31 as an example of a fixing member includes: a fixing elastic layer 31B which has been laminated on an outer circumferential face of a metallic fixing cored bar 31A; and a fixing belt 31C which covers the fixing elastic layer 31B. Both ends in the longitudinal direction of the fixing cored bar 31A are supported to be rotatable by a pair of metal plates 36 (refer to FIG. 3). The pressing roller 32 as an example of a pressing member includes: a pressing elastic layer 32B which has been laminated on an outer circumferential face of a pressing cored bar 32A; and a pressing release layer 32C which covers the pressing elastic layer 32B. Both ends in the longitudinal direction of the pressing cored bar 32A are supported to be rotatable by a pair of movable metal plates (not shown). The pressing roller 32 is pressed against the fixing roller 31 while being biased by each movable metal plate by way of a spring (not shown). The pressing roller 32 forms a fixing nip N2 together with the fixing roller 31.

The heating unit 33, while the fixing roller 31 is sandwiched, is provided at an opposite side of the fixing nip N2. The heating unit 33 includes a plurality of IH coils 33B which have been supported by a substantially semi-cylindrical holder 33A. The plurality of IH coils 33B are covered with an arched core 33C which has been formed of a ferromagnetic body such as a ferrite.

Here, functions of the fixing device 7 will be described. The pressing roller 32 is connected to a motor or the like (not shown) via a gear train or the like and then rotates while receiving a driving force of the motor. The fixing roller 31 is sequentially driven by the pressing roller 32 and then rotates along a shaft. Each IH coil 33B, while receiving supply of power from a power source (not shown), generates a high frequency magnetic field and then heats the fixing belt 31C. The fixing roller 31, while rotating around the shaft, heats a toner image on a sheet S passing through the fixing nip N2. The pressing roller 32, while rotating around the shaft, presses the sheet S passing through the fixing nip N2. Afterwards, the toner image is fixed to the sheet S. Although in the embodiment, the pressing roller 32 is driven to rotate, it may be that the fixing roller 31 is driven to rotate, and the pressing roller 32 is sequentially driven to rotate, without being limitative thereto.

As shown in FIG. 3, in the fixing device 7, a temperature sensor 35 which detects a temperature of the fixing roller 31 (fixing belt 31C) is provided. The temperature sensor 35 is disposed to oppose to the fixing roller 31 in the vicinity of a center in the longitudinal direction of the fixing roller 31. The temperature sensor 35 is a radiation thermometer which optically receives an infrared ray which has been radiated from the fixing roller 31 in a noncontact manner and then converts the amount of light reception to a temperature, for example. The temperature sensor 35 is electrically connected to a control device 37 which controls image forming operation (refer to FIG. 2). The control device 37, in the case of having determined that the temperature measured by the temperature sensor 35 indicates excessive heating of the fixing roller 3l, stops supply of power to the heating unit 33 (each IH coil 33B). In this manner, an excessive temperature rise of the fixing roller 31 can be restrained.

The temperature sensor 35 of a noncontact type needs to be positioned with a high accuracy so as to constantly keep a distance from the fixing roller 31, since a measurement range thereof is determined depending on a distance from the fixing roller 31. Therefore, the fixing device 7 according to the first embodiment includes the sensor mounting structure 34 for easily carrying out highly accurate positioning of the temperature sensor 35.

<Sensor Mounting Structure>

Figure 4:
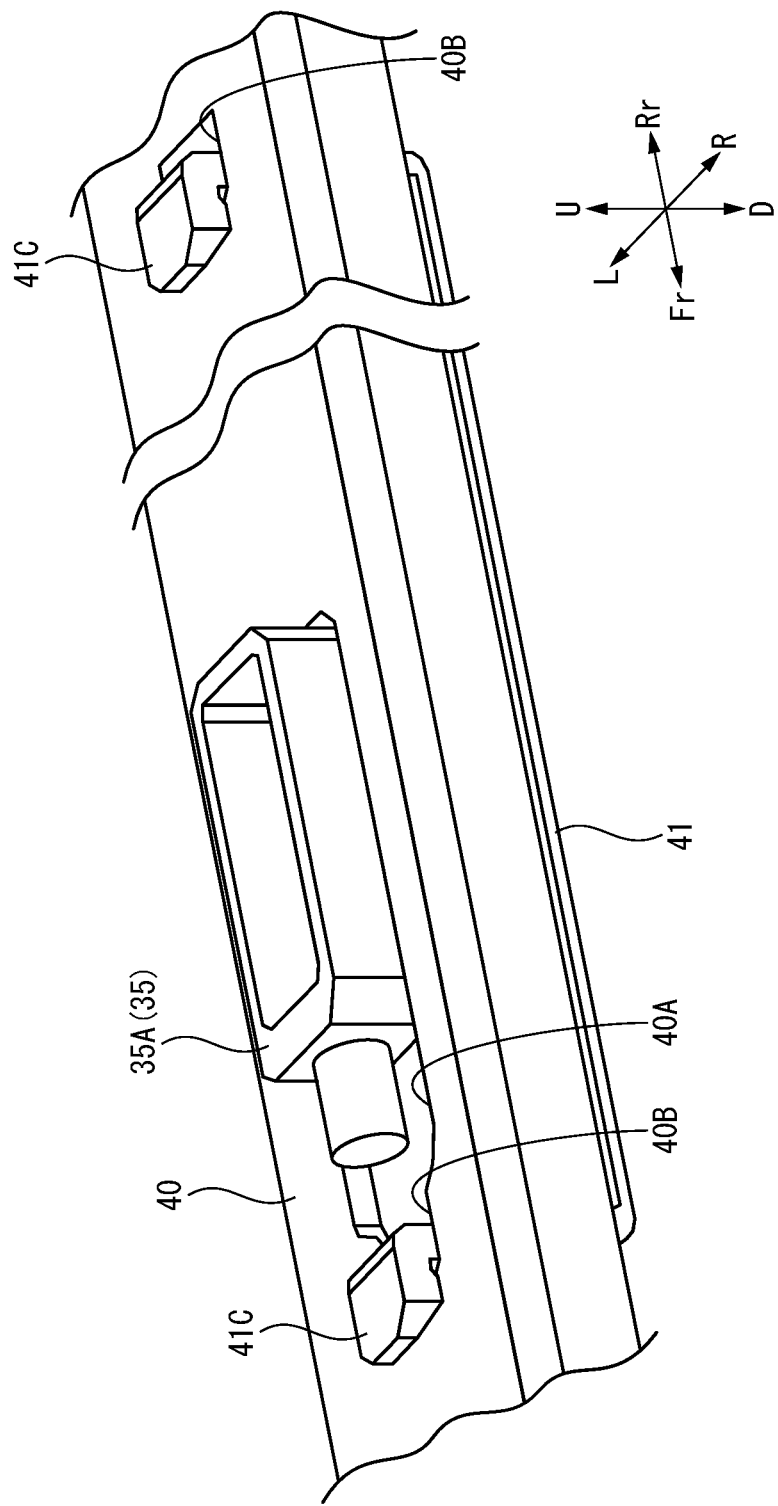
FIG. 4 is a perspective view showing the sensor mounting structure according to the first embodiment of the present disclosure.
Figure 5:
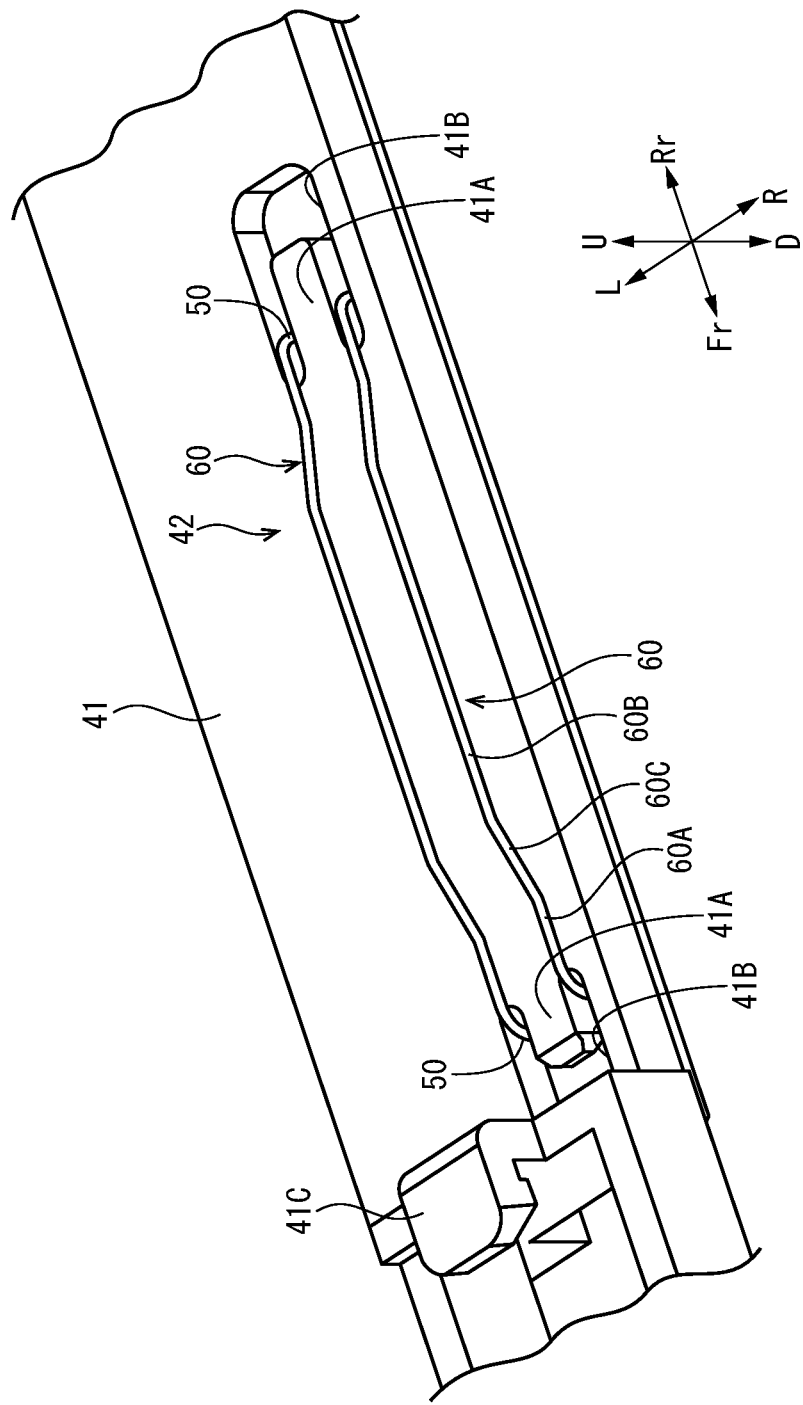
FIG. 5 is a perspective view showing a holding member and a biasing member of the sensor mounting structure according to the first embodiment of the present disclosure.
Figure 6:
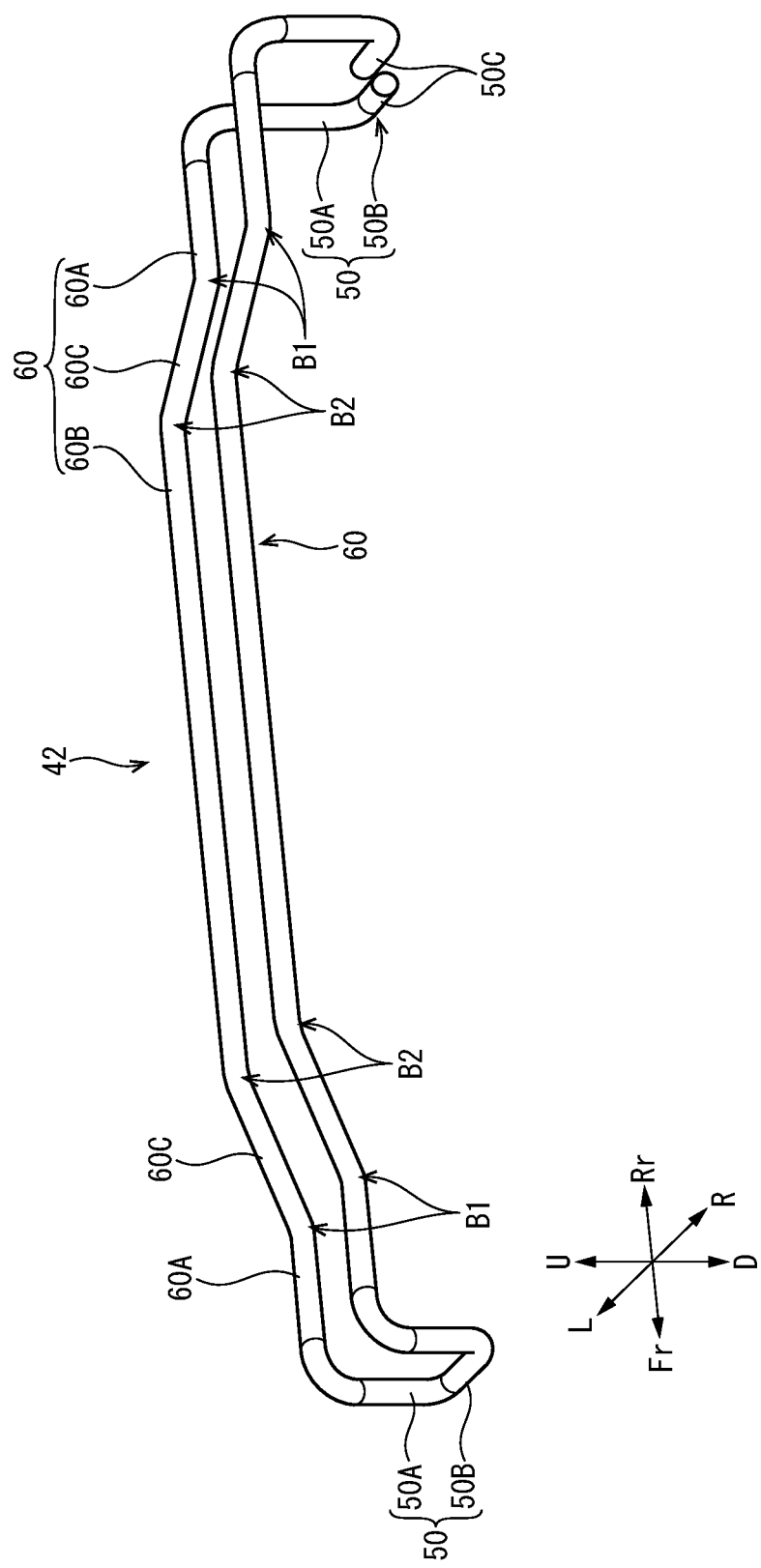
FIG. 6 is a perspective view showing the biasing member of the sensor mounting structure according to the first embodiment of the present disclosure.
Figure 7:
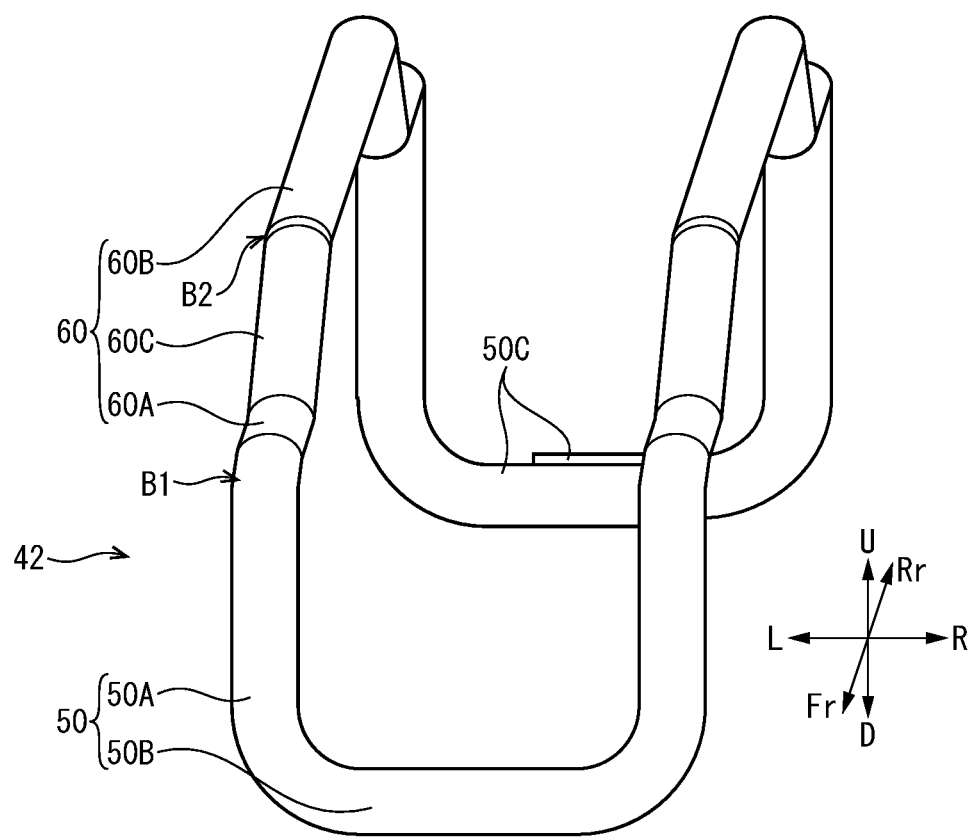
FIG. 7 is a perspective view showing, from a front side, the biasing member of the sensor mounting structure according to the first embodiment of the present disclosure.

With reference to FIG. 3 to FIG. 7, the sensor mounting structure 34 will be described. FIG. 4 is a perspective view showing the sensor mounting structure 34. FIG. 5 is a perspective view showing a holding member 41 and a biasing member 42 of the sensor mounting structure 34. FIG. 6 is a perspective view showing the biasing member 42. FIG. 7 is a perspective view showing the biasing member 42 from a front side.

As shown in FIG. 3, the sensor mounting structure 34 includes a positioning metal plate 40, the holding member 41, and the biasing member 42. The positioning metal plate 40 as an example of a positioning member is a member serving as a mounting reference of the temperature sensor 35 as well. The holding member 41 is provided to be attachable to and detachable from the positioning metal plate 40. The biasing member 42 is attached to the holding member 41.

The positioning metal plate 40 is overhung between a pair of longitudinal metal plates 36 at a lower side than the fixing roller 31. The positioning metal plate 40 is made of a metal material, for example, and is formed in a substantially plate-like shape. The positioning metal plate 40 is disposed to be substantially in parallel to the fixing roller 31, and a top face thereof forms a substantially horizontal face.

As shown in FIG. 4, in the vicinity of a center in the longitudinal direction of the positioning metal plate 40, a positioning hole 40A for exposing a light reception part 35A of the temperature sensor 35 opens. The positioning hole 40A is formed in a substantially rectangular shape as seen from a plane. In addition, at the positioning metal plate 40, a pair of hook engaging holes 40B open while being spaced from each other in the longitudinal direction. A front hook engaging hole 40B is formed so as to cut out a front end of the positioning hole 40A towards the front side. Namely, the front hook engaging hole 40B is formed integrally with the positioning hole 40A. A rear hook engaging hole 40B is formed at a position which is distant more rearward than that of the positioning hole 40A. Each hook engaging hole 40B is formed in a substantially rectangular shape as seen from a plane.

As shown in FIG. 5, the holding member 41 is made of a synthetic resin material, for example, and is formed in a substantially plate-like shape which is elongated in the longitudinal direction. At the holding member 41, a pair of engaging protrusions 41A are formed to be spaced from each other in the longitudinal direction. Around the pair of engaging protrusions 41A, a spring engaging hole 41B formed in a substantial U-shape opens. In other words, the pair of engaging protrusions 41A are formed while extending in a direction in which these protrusions are spaced from each other from an edge at which the pair of spring engaging holes 41B oppose to each other. A rear engaging protrusion 41A is formed to be elongated more significantly in the longitudinal direction and to be thicker in the vertical direction than a front engaging protrusion 41A (refer to FIG. 8).

In addition, as shown in FIG. 4 and FIG. 5, in the holding member 41, a pair of hooking parts 41C are formed to be spaced from each other so as to sandwich the pair of engaging protrusions 41A between both sides in the longitudinal direction. Each hooking part 41C is formed in a substantial L-shape while a tip end thereof extending upward from a top face of the holding member 41 is bent to a front side. A return part protrudes on a bottom face of a tip end of each hooking part 41C. Although later described in detail, the pair of hooking parts 41C engage with the pair of hook engaging holes 40B, and the holding member 41 is thereby attached to the positioning metal plate 40.

As shown in FIG. 6 and FIG. 7, the biasing member 42 is formed in the shape of an elongated ring in the longitudinal direction by bending a metallic wire rod, for example. The biasing member 42 includes a pair of arched parts 60 which are overhung between a pair of engaging parts 50 which engage with the holding member 41.

The pair of engaging parts 50 are disposed to be spaced from each other in the longitudinal direction. The pair of engaging parts 50 extend downward from both ends in the longitudinal direction (overhanging direction) of the pair of arched parts 60. The pair of engaging parts 50 each are formed in a substantial U-shape which is bent so as to overhang on the engaging protrusion 41A. In more detail, each engaging part 50 is formed in a substantially rectangular shape (substantial U-shape) by: a pair of longitudinal lines 40A extending substantially vertically downward from the pair of arched parts 60; and a transverse line 50B extending in a substantially horizontal direction so as to connect a lower end of the pair of longitudinal lines 50A thereto. Although the pair of engaging parts 50 are of the substantially same size and are formed in the substantially same shape, the longitudinal line 50B of the rear engaging part 50 is cut, and constitutes a pair of cut ends 50C. The pair of cut ends 50 extend in a transverse direction so as to overlap in parallel to each other.

The pair of arched parts 60 each are formed in a substantially arched shape (substantially archery shape) which protrudes to an upper side. The pair of arched parts 60 are provided to be arranged substantially in parallel to the transverse direction (widthwise direction). The pair of arched parts 60 are formed in the same shape, and therefore, hereinafter, a single arched part 60 will be described.

The arched part 60 includes a pair of supporting lines 60A, a contact line 60B, and a pair of inclination lines 60C. The pair of support lines 60A are provided while extending in the longitudinal direction so that the support lines approach each other from the longitudinal lines 50A of the pair of engaging parts 50. The contact line 60B is positioned at an upper side than the pair of supporting lines 60A (pressing direction), and is provided while extending in the longitudinal direction between the pair of supporting lines 60A. The pair of inclination lines 60C connect the pair of supporting lines 60A and the contact line 60B. Each inclination line 60C bends obliquely upward via a bent part B1 between the respective supporting lines 60A, and bends obliquely downward via a bent part B2 with respect to the contact line 60B. Namely, the pair of inclination lines 60C incline upward from the outside towards the inside in the longitudinal direction. Therefore, the arched part 60 is formed in a substantially trapezoidal shape as seen from a lateral side.

Figure 8:
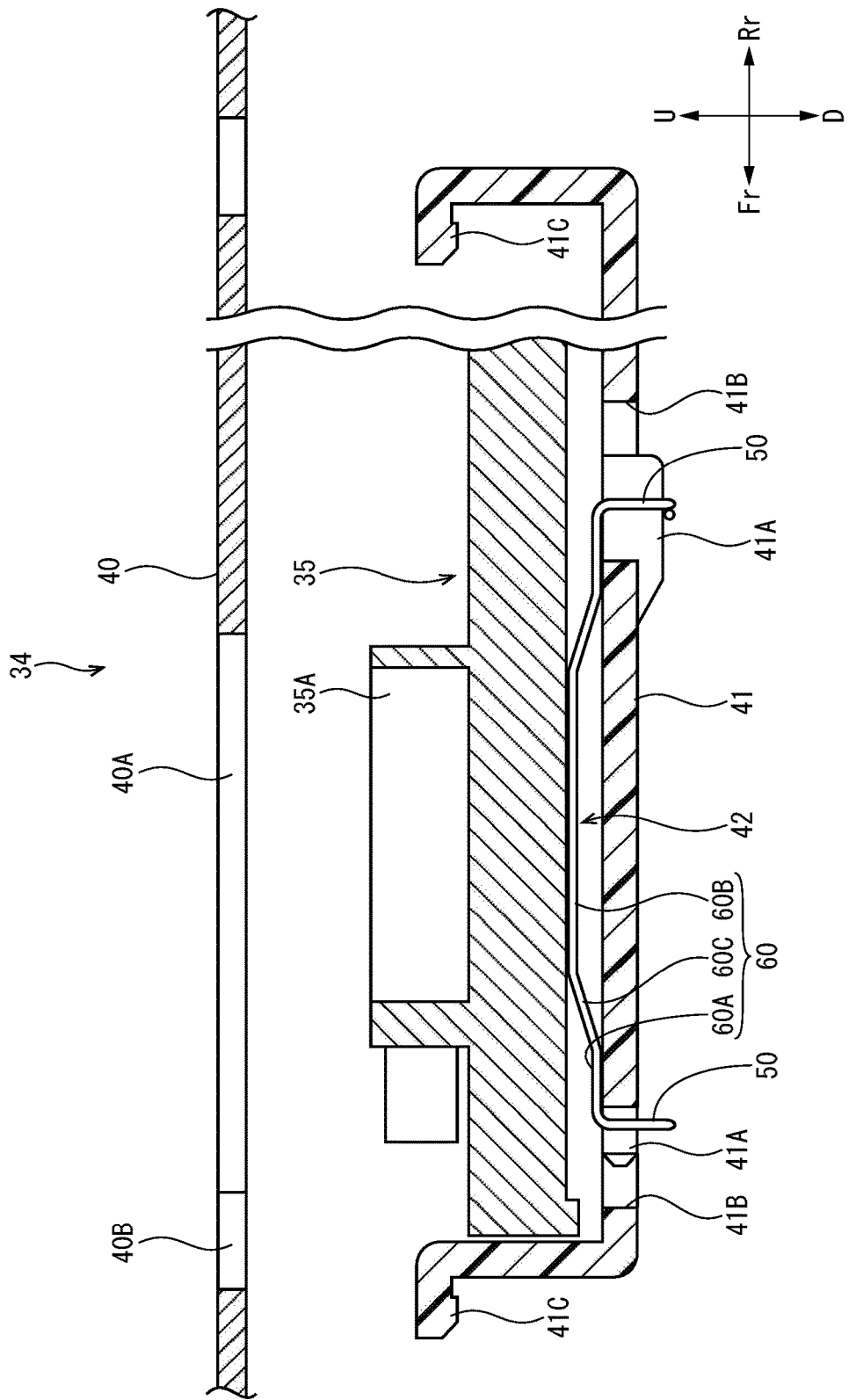
FIG. 8 is a sectional view showing an assembling course of the sensor mounting structure according to the first embodiment of the present disclosure.
Figure 9:
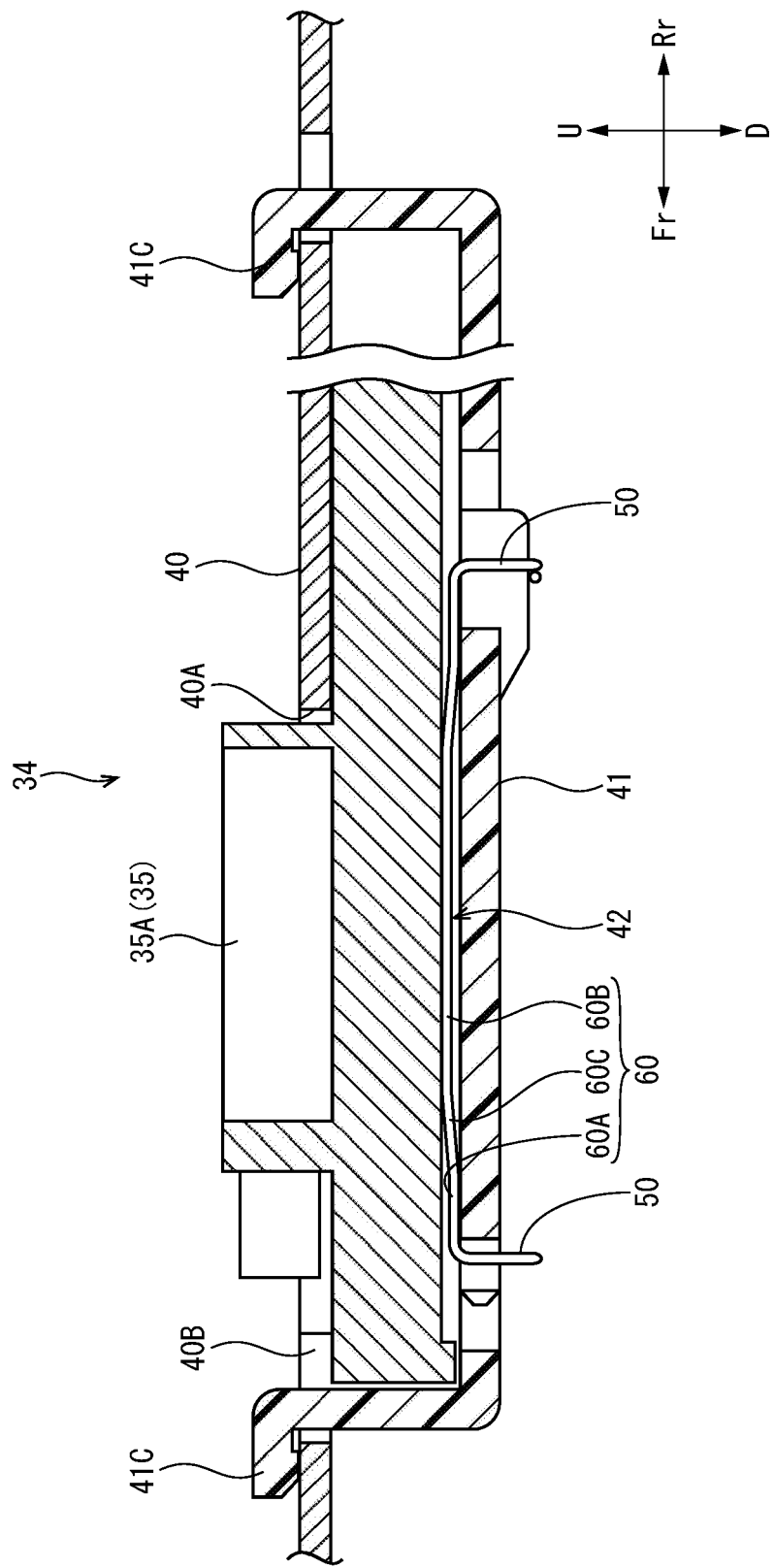
FIG. 9 is a sectional view showing the sensor mounting structure according to the first embodiment of the present disclosure.

Next, with reference to FIG. 5, FIG. 8, and FIG. 9, an assembling procedure of the sensor mounting structure 34 (positioning procedure of the temperature sensor 35) will be described. FIG. 8 is a sectional view showing the assembling course of the sensor mounting structure 34. FIG. 9 is a sectional view showing the sensor mounting structure 34.

First, as shown in FIG. 5, a worker mounts the biasing member 42 to the holding member 41. For example, the worker hooks the front engaging part 50 of the biasing member 42 on the front protrusion 41A that has been formed in the holding member 41. Subsequently, the worker, while rearward pulling and stretching the biasing member 42, hooks the rear engaging part 50 on the rear engaging protrusion 41A. In the manner as described above, the biasing member 42 is in a state of being mounted to the holding member 41 via the pair of engaging parts 50 (refer to FIG. 8 as well). The worker may hook the front engaging part 50 on the engaging protrusion 41A after having hooked the rear engaging part 50 on the engaging protrusion 41A.

Next, as shown in FIG. 8, the worker places the temperature sensor 35 in a posture in which the light reception part 35A has been oriented to an upper side on the biasing member 42 (the pair of arched parts 60) that has been mounted to the holding member 41 and thereafter mounts the holding member 41 to a lower side of the positioning metal plate 40. Specifically, the worker passes the front part 41C of the holding member 41 from a lower side to an upper side with respect to the front hook engaging hole 40B that has been formed in the positioning metal plate 40 and then hooks the hooking part 41C on a front side edge of the hook engaging hole 40B (refer to FIG. 9).

Subsequently, the worker upward turns a rear part of the holding member 41 while a contact part between the hooking part 41C and the hook engaging hole 40B is employed as a supporting point. Afterwards, the light reception part 35A of the temperature sensor 35 passes through the positioning hole 40A from the lower side to the upper side, and a part other than the light reception part 35A of the temperature sensor 35 comes into contact with a bottom face of the positioning metal plate 40 (refer to FIG. 9).

When turning of the holding member 41 advances, the temperature sensor 35 moves relatively downward and thus the pair of arched parts 60 (each inclination line 60C) is pressed to the holding member 41 side and then elastically deforms. That is, in more detail, bent parts B1, B2 of each arched part 60 (refer to FIG. 6) slacken and then each inclination line 60C elastically deforms so as to be substantially in parallel to the contact line 60B (each supporting line 60A) (refer to FIG. 9). Concurrently with elastic deformation of each arched part 60, an entire length of the biasing member 42 slightly extends in the longitudinal direction.

When turning of the holding member 41 further advances, the rear hooking part 41C of the holding member 41 comes into contact with the bottom face of the positioning metal plate 40. The worker, while rearward slackening the rear hooking part 41C, inserts it into the rear hook engaging hole 40B. Afterwards, as shown in FIG. 9, the rear hooking part 41C passes through the rear hook engaging hole 40B and is then hooked on a front side edge thereof. In the manner as described above, assembling of the sensor mounting structure 34 (positioning of the temperature sensor 35) completes. The holding member 41 may be fixed to the positioning metal plate 40 by a fixing member such as a screw so as to maintain the state in which the holding member has been hooked on the positioning metal plate 40.

The holding member 41 is mounted to the positioning metal plate 40 so as to form a space in which the temperature sensor 35 is disposed with respect to the positioning metal plate 40. In addition, the biasing member 42, while the holding member 41 is attached to the positioning metal plate 40, elastically deforms the pair of arched parts 60 that has been sandwiched between the holding member 41 and the temperature sensor 35 that has been disposed in the space so as to bias the temperature 35 towards the positioning metal plate 40. In more detail, the biasing member 42 brings each supporting line 60A into contact with a top face of the holding member 41 and brings the contact line 60B into contact with a bottom face of the temperature sensor 35 and then biases the holding member 41 and the temperature sensor 35 in a state in which they are spaced from each other by a resilient force of each inclination line 60C. In actual, each contact line 60B slackens slightly downward at an intermediate part in the longitudinal direction and thus four bent parts B2 between each inclination line 30C and the contact line 60B (refer to FIG. 6) come into contact with the bottom face of the temperature sensor 35. Namely, the temperature sensor 35 is biased upward while being supported by the biasing member 42 at substantially four points.

The sensor mounting structure 34 according to the first embodiment as described hereinabove is configured in such a manner that the biasing member 42 is mounted to the holding member 1 via the pair of engaging parts 50. In addition, the above structure is configured in such a manner that the holding member 41 having mounted the biasing member 41 thereto is attached to the positioning metal plate 40, and the temperature sensor 35 having been disposed between the positioning metal plate 40 and the holding member 41 is thereby biased towards the pair of arched part 60 and then is pressed against the positioning metal plate 40. With this configuration, the temperature sensor 35 can be fixed to the positioning metal plate 40 merely by carrying out a simple work of attaching the holding member 41 that has mounted the biasing member 42 to the positioning metal plate 40. In this manner, a distance between the fixing roller 31 and the temperature sensor 35 can be kept constant. Namely, positioning of the temperature sensor 35 can be easily and accurately carried out. With the configuration of the embodiment, the fixing device 7 having the sensor mounting structure that achieves the technical effects as described above and the image forming apparatus 1 having the fixing device 7 are provided.

In addition, with the sensor mounting structure 34 according to the first embodiment, an annular biasing member 42 can be less expensively manufactured by applying a bending process or the like to a wire rod. Further, the pair of engaging parts 50 are hooked on the pair of engaging protrusions 41A to be thereby able to easily mount the biasing member 42 to the holding member 41. In this manner, the assembling work of the sensor mounting structure 34 can be easily carried out.

Second Embodiment

Figure 10:
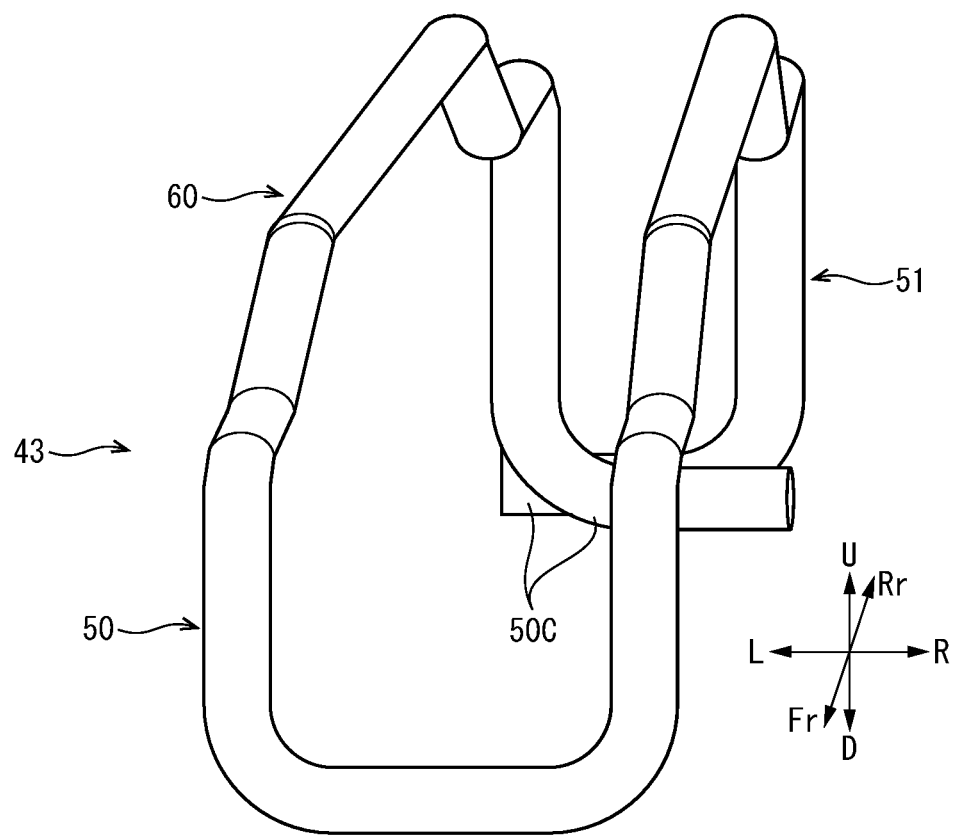
FIG. 10 is a perspective view showing a biasing member of a sensor mounting structure according to a second embodiment of the present disclosure.

Next, with reference to FIG. 10, a sensor mounting structure 34 (biasing member 43) according to a second embodiment will be described. FIG. 10 is a perspective view showing the biasing member 43. In the following description, like constituent elements of the sensor mounting structure 34 according to the first embodiment are designated by like reference numerals, and a duplicate description thereof is omitted (this also applies to other embodiments which will be described later).

The biasing member 43 has engaging parts 50, 51 which are longitudinally different from each other. The cut rear engaging part 51 is formed to be narrower in a transverse direction (widthwise direction) than the front engaging part 50 that is not cut (that is, continuous). Therefore, an overlap width of a pair of cut ends 50C becomes large. In addition, a gap (transverse gap) between a pair of arched parts 60 is gradually narrower from a front side towards a rear side.

In the sensor mounting structure 34 (biasing member 43) according to the second embodiment as described hereinabove, the rear engaging part 51 sandwiches the engaging protrusion 41A while being overhung on the rear engaging protrusion 41A that is formed in the holding member 41 (refer to FIG. 8 or the like). With this configuration, slippage of the biasing member 43 that is mounted to the holding member 41 can be prevented, and the biasing member 43 with respect to the holding member 41 can be held.

Third Embodiment

Figure 11:
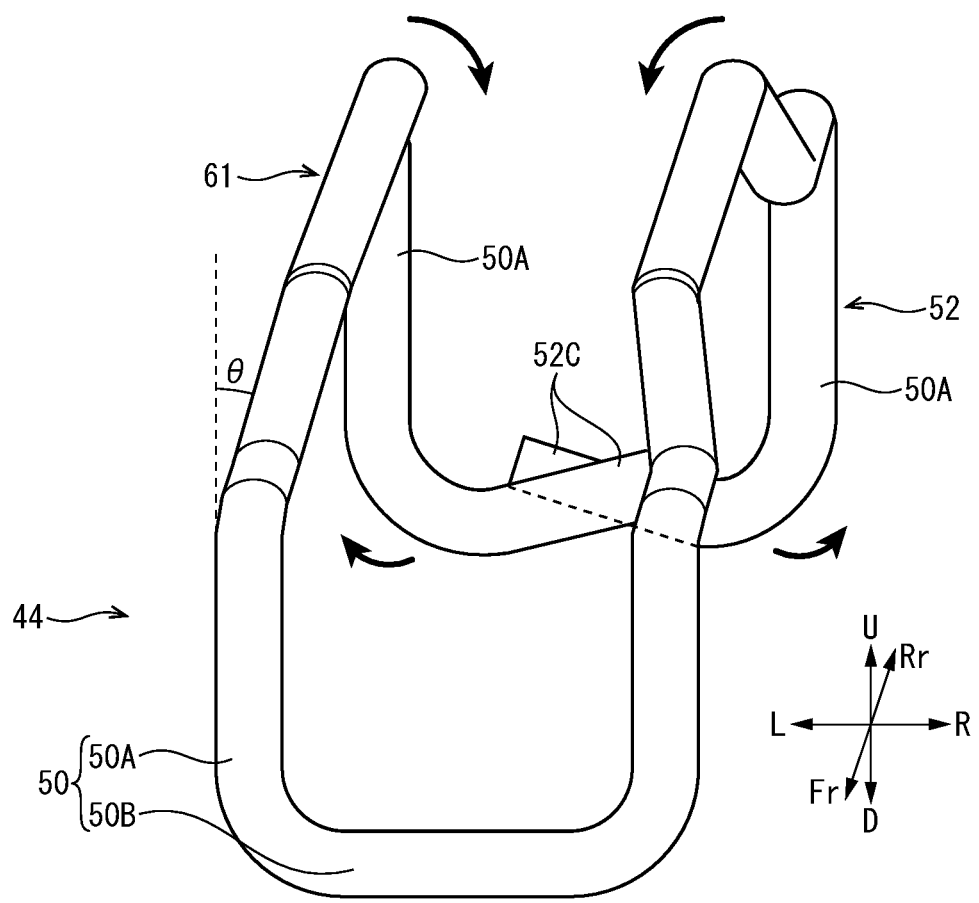
FIG. 11 is a perspective view showing a biasing member of a sensor mounting structure according to a third embodiment of the present disclosure.

Next, with reference to FIG. 11, a sensor mounting structure 34 (biasing member 44) according to a third embodiment will be described. FIG. 11 is a perspective view showing the biasing member 44.

The biasing member 44 includes a pair of cut ends 52C extending in a transverse direction (widthwise direction) so that cut rear engaging parts 52 cross each other. The pair of cut ends 52C each incline obliquely upward from a proximal end (longitudinal line 50A side) towards an end face side (free end side). That is, the pair of cut ends 52C each incline so as to relatively bias the engaging protrusion 41A upward (in the pressing direction) while the rear engaging part 52 is hooked on the engaging protrusion 41A (refer to FIG. 8 or the like). Therefore, the rear engaging part 52 tightens the engaging protrusion 41A while being overhung on the rear engaging protrusion 41A that has been formed in the holding member 41.

In addition, the biasing member 44 inclines to the inside in a transverse direction so that a pair of arched parts 61 approach each other towards an upper side. Inclination (inclination angle θ) of each arched part 61 is set in a range of 5 degrees to 10 degrees (5 degrees or more and 10 degrees or less) with respect to a vertical line that has been extended vertically upward from a longitudinal line 50A that is connected to the arched part 61.

In the course in which the holding member 41 mounted to the biasing member 44 is attached to the positioning metal plate 40, the pair of arched parts 61 are pressed against a temperature sensor 35 which relatively lowers and then elastically deformed downward while twisting so that these arched parts approach each other. The pair of arched parts 61 inward twist each other and thus the pair of cut ends 52C turn so as to extend in the transverse direction (refer to the arrow of FIG. 11). Therefore, the pair of cut ends 52C deform from a posture in which these cut ends have inclined so as to cross each other to a posture in which they are formed in parallel to each other. Afterwards, tightening of the engaging protrusion 41A by the rear engaging part 52 is released. On the other hand, the pair of arched parts 61 elastically deform while inward twisting each other and then presses the temperature sensor 35 against the positioning metal plate 40.

In the sensor mounting structure 34 (biasing member 44) according to the third embodiment as described hereinabove, the cut rear engaging part 52 (pair of cut ends 52C) is configured to tighten the engaging protrusion 41A. With this configuration, slippage of the biasing member 44 that has been mounted to the holding member 41 can be prevented. In addition, the pair of arched parts 61, while the holding member 41 is attached to the positioning metal plate 40, are pressed relatively against the temperature sensor 35 and then twist so that the arched parts further approach each other to thereby decrease a biasing force of the pair of cut ends 52C with respect to the engaging protrusion 41A. With this configuration, tightening of the engaging protrusion 41A by the rear engaging part 52 is released, so that the pair of arched parts 61 can elastically deform substantially uniformly all over the longitudinal direction. In this manner, the temperature sensor 35 can be pressed against the positioning metal plate 40 by an appropriate biasing force.

Fourth Embodiment

Figure 12:
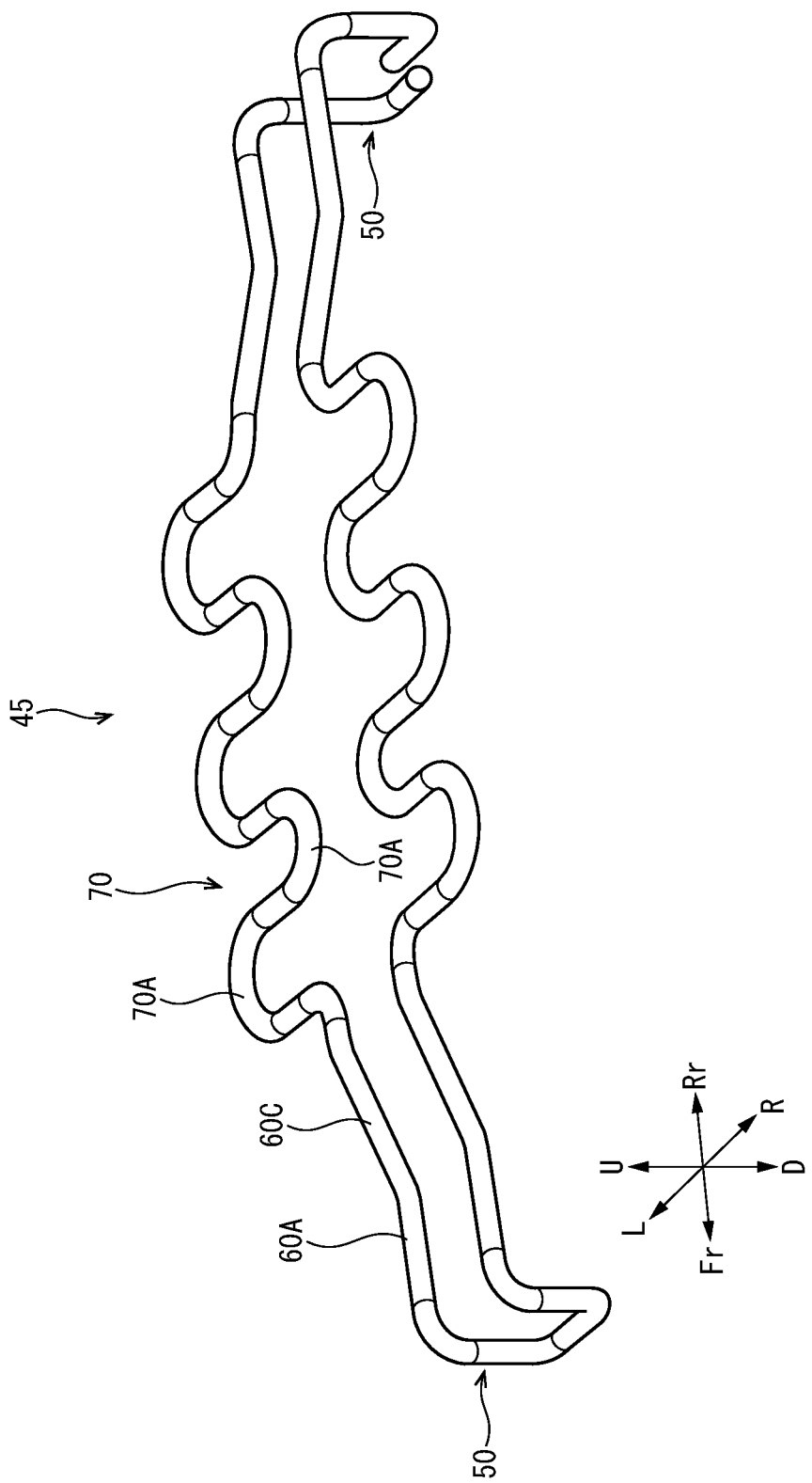
FIG. 12 is a perspective view showing a biasing member of a sensor mounting structure according to a fourth embodiment of the present disclosure.

Next, with reference to FIG. 12, a sensor mounting structure 34 (biasing member 45) according to a fourth embodiment will be described. FIG. 12 is a perspective view showing the biasing member 45.

An arched part 62 of the biasing member 45 includes an elastic part 70 which elastically deforms in a longitudinal direction (overhanging direction). Namely, the biasing member 45 is configured to expand or contract in the longitudinal direction. A pair of elastic parts 70 are formed in the arched part 62 in place of a contact line 60B. Each elastic part 70 is formed while a return part 70A in a substantial U-shape, which has been returned in a transverse direction as seen from a plane, is made continuous in the longitudinal direction. Namely, each elastic part 70 is formed so as to meander in the transverse direction on a horizontal plane.

With the sensor mounting structure 34 (biasing member 45) according to the fourth embodiment as described hereinabove, each elastic part 70 can be pulled and stretched in the longitudinal direction, so that the biasing member 45 can be easily mounted to a holding member 41. The characterizing features of the biasing member 45 described above may be applied to the biasing members 43, 44 according to the second or third embodiment.

Figure 13:
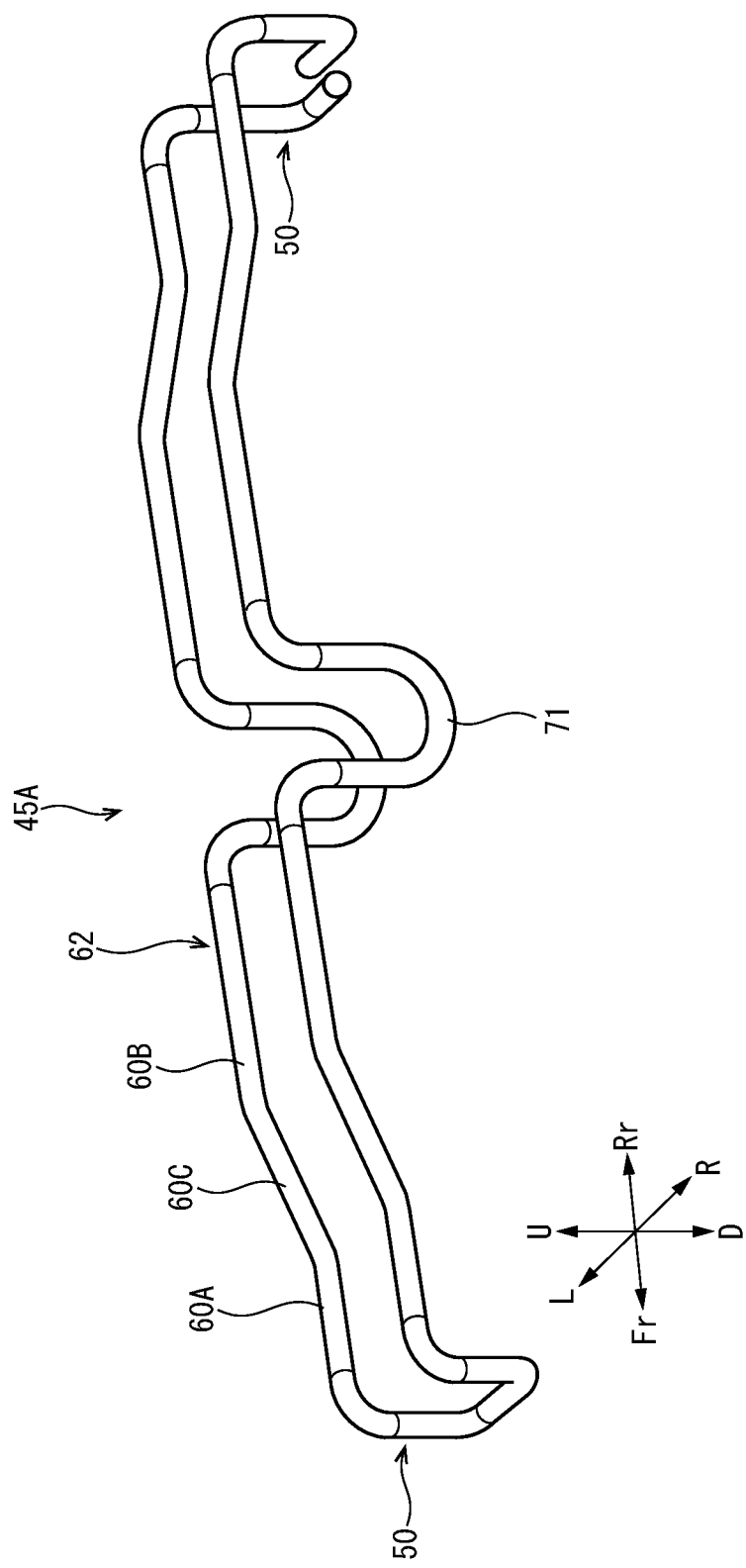
FIG. 13 is a perspective view showing a biasing member of a sensor mounting structure according to a modification example of the fourth embodiment of the present disclosure.
Figure 14:
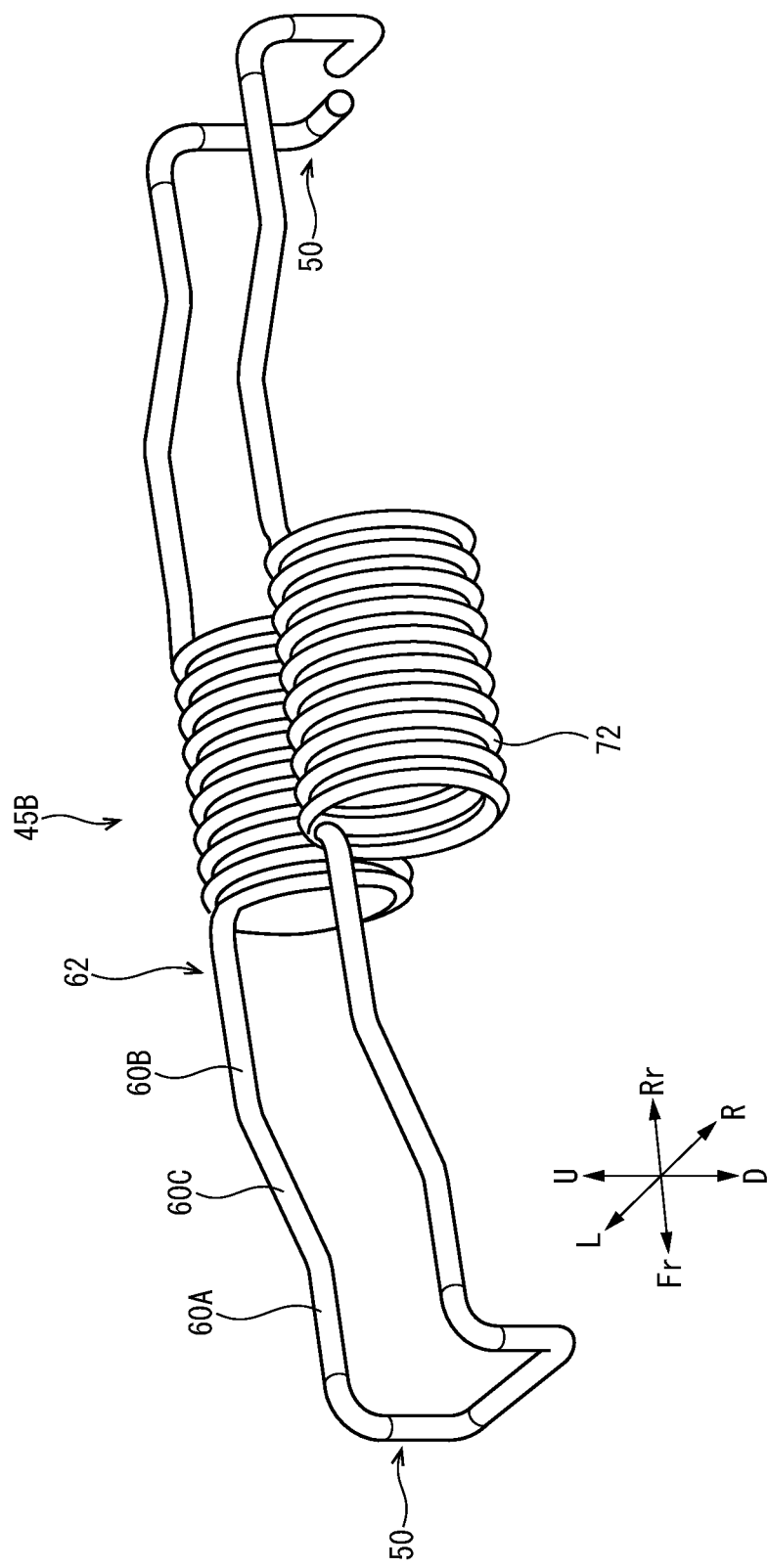
FIG. 14 is a perspective view showing a biasing member of a sensor mounting structure according to another modification example of the fourth embodiment of the present disclosure

In addition, although the biasing member 45 described above is formed in the shape meandering on the horizontal plane, the present disclosure is not limitative thereto. For example, as shown in FIG. 13, as a biasing member 45 according to a modification example of the fourth embodiment, each elastic part 71 may be formed to bend towards a part of each arched part 62 (for example, in the vicinity of a center in the longitudinal direction of the contact line 60B) in a substantial U-shape (downward protrusive shape). In addition, for example, as shown in FIG. 14, as a biasing member 45B according to another modification example of the fourth embodiment, each elastic part 72 may be formed in the shape of a coil spring by spirally bending a part of each arched part 62 (for example, in the vicinity of the center in the longitudinal direction of the contact line 60B). In a case where the biasing members 45A, 45B described above are employed, it is preferable that a release hole (not shown) for releasing the elastic parts 71, 72 be formed while the biasing members 45A, 45B are mounted to the holding member 41. In addition, any one of the elastic members 70 to 72 may be formed in one arched part 62.

Fifth Embodiment

Figure 15:
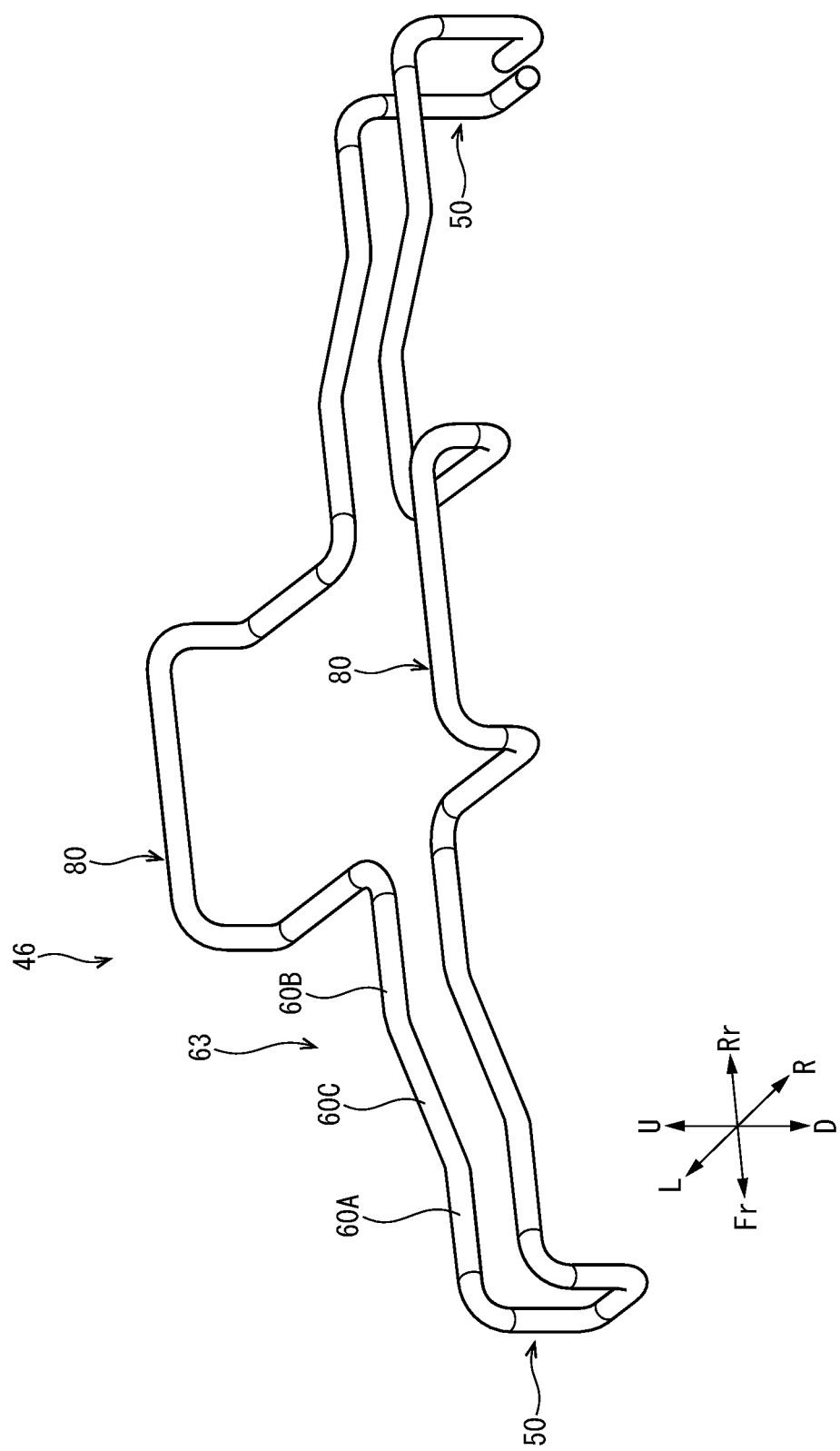
FIG. 15 is a perspective view showing a biasing member of a sensor mounting structure according to a fifth embodiment of the present disclosure.

Next, with reference to FIG. 15, a sensor mounting structure 34 (biasing member 46) according to a fifth embodiment will be described. FIG. 15 is a perspective view showing the biasing member 46.

The biasing member 46 includes a pair of restraining parts 80 which supports a temperature sensor 35 disposed on an arched part 63 so as to hold the sensor. The pair of restraining parts 80 are formed integrally with each arched part 63. The pair of restraining parts 80 each are formed in a substantial U-shape protruding towards the outside in the transverse direction from a contact line 60B of the pair of arched parts 63 as seen from a plane. Each restraining part 80 is formed in a substantial L-shape while a tip end thereof extending substantially horizontally from the contact line 60B is bent upward as seen from a front side. The temperature sensor 35 is disposed between the pair of restraining parts 80.

With the sensor mounting structure 34 (biasing member 46) according to the fifth embodiment as described hereinabove, the pair of restraining parts 80 hold the temperature sensor 35 to be thus able to restrain movement of the temperature sensor 35 on the plane (in the longitudinal or transverse direction) due to vibration which is generated by rotation or the like of the respective rollers 31, 32. In addition, each restraining part 80 elastically deforms, and vibration of the temperature sensor 35 can be absorbed. In this manner, the temperature sensor 35 can be protected. The features of the biasing member 46 described above may be applied to any one of the biasing members 43 to 45 according to the second to fourth embodiments.

Sixth Embodiment

Figure 16:
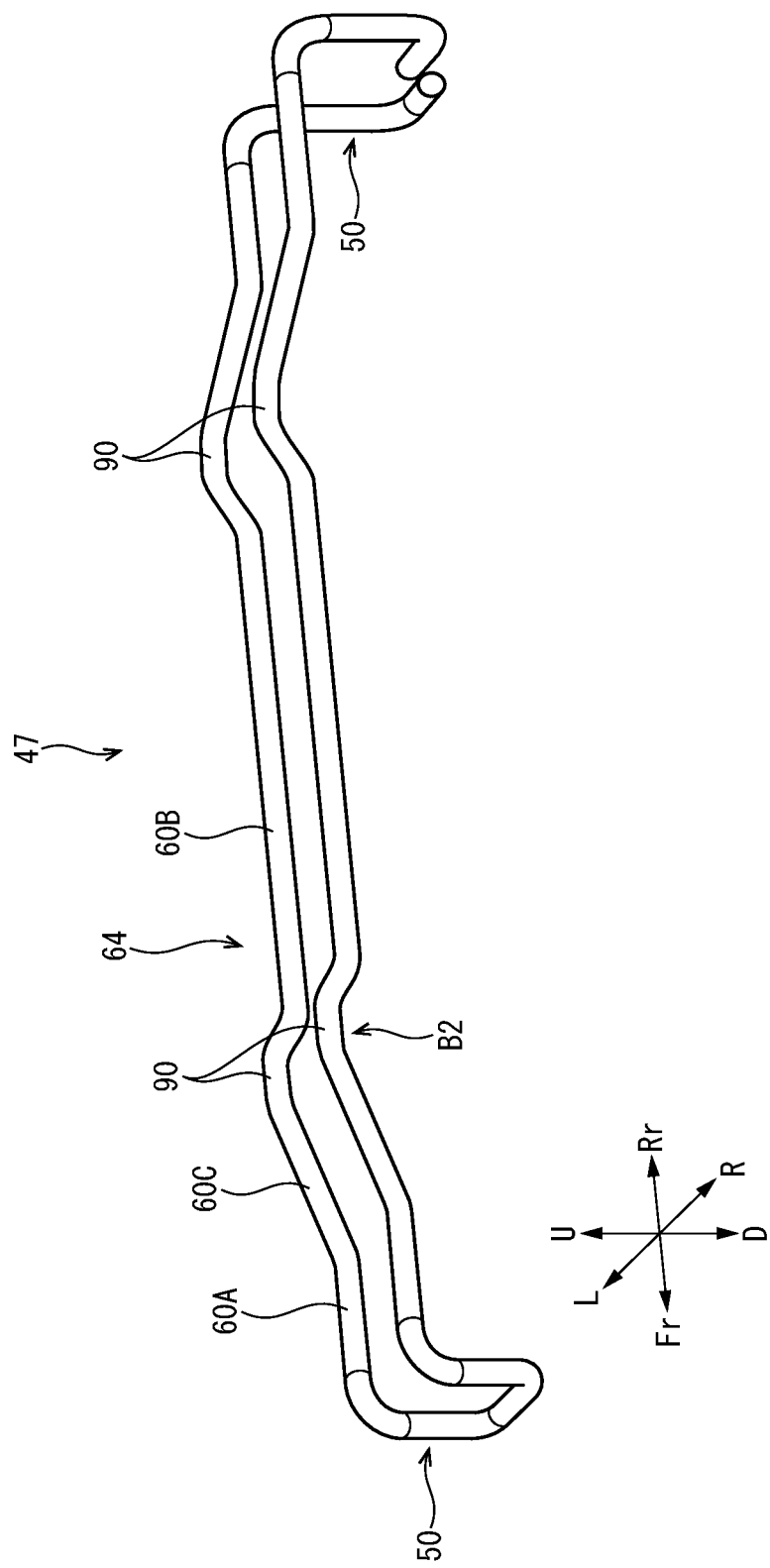
FIG. 16 is a perspective view showing a biasing member of a sensor mounting structure according to a sixth embodiment of the present disclosure.

Next, with reference to FIG. 16, a sensor mounting structure 34 (biasing member 47) according to a sixth embodiment will be described. FIG. 16 is a perspective view showing the biasing member 47.

An arched part 64 of the biasing member 47 includes four contact parts 90 which come into contact with a temperature sensor 35. The four contact parts 90 are formed in a bent part B2 between each inclined part 60C and a contact line 60B. The four contact parts 90 are disposed at a pair of arched parts 64 so as to form apexes of a rectangle as seen from a plane. That is, the four contact parts 90 are disposed so that lines connecting the respective contact parts 90 constitute a plane (rectangle). Each contact part 90 is formed in a substantially trapezoidal shape as seen from a lateral side. The contact line 60B is formed in a position which is lower by one step than that of each contact part 90 between a pair of longitudinal contact parts 90. The temperature sensor 35 is placed on the four contact parts 90. Each contact part 90 may be formed in the inclination line 60C.

With the sensor mounting structure 34 (biasing member 47) according to the sixth embodiment as described hereinabove, the temperature sensor 35 can be supported at four points. In this manner, backlash of the temperature sensor 35 is restrained so as to be thereby able to stabilize a state in which the temperature sensor 35 is pressed against the positioning metal plate 40. The characterizing features of the biasing member 47 described above may be applied to any one of the biasing members 43 to 46 according to the second to fifth embodiments.

In addition, although the biasing member 47 described above included a total of four contact parts 90 while two contact parts 90 are provided in one arched part 64, the present disclosure is not limitative thereto. It is sufficient if three or more contact parts 90 are provided. In addition, it is preferable that at least one or more contact parts 90 be provided in one arched part 64. Namely, for example, three contact parts 90 are disposed so as to form apexes of a triangle, and the temperature sensor 35 can be thereby supported in a stable manner.

Although the biasing members 42 to 47 of the sensor mounting structure 34 according to the first to sixth embodiments are made of a metallic wire rod and are formed in an annular shape, the present disclosure is not limitative thereto. For example, in place of two arched parts 60 to 64, one plate-shaped arched part (not shown) may be overhung between a pair of engaging parts 50 to 52.

In addition, although in the biasing members 42 to 47 of the sensor mounting structure 34 according to the first to sixth embodiments, the respective engaging parts 50 to 52 are bent in the substantial rectangular shape (substantial U-shape), the present disclosure is not limitative thereto. For example, a pair of engaging parts may curve so as to form a substantially semi-cylindrical shape. Further, although in the biasing members 42 to 47, the rear engaging parts 50 to 52 are cut, the front engaging part 50 may be cut without being limitative thereto.

Furthermore, although in the biasing members 42 to 47 of the sensor mounting structure 34 according to the first to sixth embodiments, the pair of engaging parts 50 to 52 are formed in the same length in the vertical direction, the present disclosure is not limitative thereto. Although not shown, for example, either one of the pair of engaging parts 50 to 52 may be formed to be larger in length than the other one. In this manner, the biasing members 42 to 47 are easily mounted to the holding member 41, and the assembling work of the sensor mounting structure 34 can be further easily carried out.

Still furthermore, although the description of the first to sixth embodiments is presented as to a case in which the sensor mounting structure 34 is applied to mount the temperature sensor 35 of the fixing device 7, the present disclosure is not limitative thereto. For example, the sensor mounting structure 34 may be applied to mount an optical sensor for detecting a conveyance failure of a sheet S in a conveying path 8 or a magnetic sensor or the like for detecting the amount of toner in the development device 16. That is, the sensor mounting structure 34 of the present disclosure is applicable to mounting of an arbitrary sensor.

Yet furthermore, although description of the first to sixth embodiments, as an example, is presented as to a case in which the present disclosure is applied to the color printer 1, the present disclosure may be applied to a monochrome printer, a copying machine, a facsimile machine or a multifunction peripheral or the like, for example, without being limitative thereto.

The description of the foregoing embodiments presents an aspect in a sensor mounting structure, a fixing device, and an image forming apparatus including the same, according to the present disclosure, the technical scope of the present disclosure is not limitative to the foregoing embodiments.

While the present disclosure has been described with reference to the particular illustrative embodiments, it is not to be restricted by the embodiments. It is to be appreciated that those skilled in the art can change or modify the embodiments without departing from the scope and spirit of the present disclosure.

The invention claimed is:

1. A sensor mounting structure comprising:
   a positioning member positioning a sensor;
   a holding member provided to be attachable to and detachable from the positioning member so as to form a space in which the sensor is disposed with respect to the positioning member; and
   a biasing member made of a wire rod, formed in an annular shape, and composed of a pair of engaging parts engaging with the holding member and a pair of arched parts overhung between the pair of engaging parts,
   wherein the holding member includes a pair of engaging protrusions which are formed while extending in a direction in which the engaging protrusions are distantly spaced from each other in a direction in which the arched parts are overhung,
   either one of the pair of engaging parts is cut,
   the pair of engaging parts are formed in a shape curving or bending so as to respectively overhang on the engaging protrusions,
   the pair of arched parts are arranged side by side in a widthwise direction that crosses a direction pressing the sensor and the overhanging direction, each of the pair of arched parts is composed of a pair of supporting lines, a pair of inclination lines, and a contact line, the pair of supporting lines are extended in a direction approaching each other from the pair of engaging parts, and come into contact with the holding member, the pair of inclination lines are obliquely bent in the pressing direction from one side ends of the pair of supporting lines, the contact line has both ends connected to one side ends of the pair of inclination lines, is extended in the overhanging direction, and comes into contact with the sensor, and the biasing member, while the holding member is attached to the positioning member, elastically deforms the arched part that is sandwiched between the holding member and the sensor that is disposed in the space so as to bias the sensor to the positioning member.

2. The sensor mounting structure according to claim 1, wherein the engaging part having been cut is formed to be narrower in the widthwise direction than the engaging part that is continuous, and sandwiches the engaging protrusion while being overhung on the engaging protrusion.

3. The sensor mounting structure according to claim 1, wherein the engaging part having been cut includes a pair of cut ends extending in the widthwise direction so as to cross each other, the pair of cut ends incline so as to relatively bias the engaging protrusion in the pressing direction while the engaging part having been cut is overhung on the engaging protrusion, the pair of arched parts incline to an inside in the widthwise direction so as to approach each other towards the pressing direction, and the pair of arched parts, while the holding member is attached to the positioning member, are relatively pressed against the sensor and then twist so as to further approach each other to thereby decrease a biasing force of the pair of cut ends with respect to the engaging protrusion.

4. The sensor mounting structure according to claim 3, wherein an inclination angle of said each arched part is set in a range of 5 degrees or more and 10 degrees or less with respect to a vertical line extending vertically upward from a longitudinal line which is connected to the arched part.

5. The sensor mounting structure according to claim 1, wherein at least one of the arched parts includes an elastic part elastically deforming in an overhanging direction.

6. The sensor mounting structure according to claim 5, wherein the elastic part is formed to meander in the widthwise direction.

7. The sensor mounting structure according to claim 5, wherein the elastic part has a downward protrusive shape.

8. The sensor mounting structure according to claim 5, wherein the elastic part is spirally formed.

9. The sensor mounting structure according to claim 1, wherein the biasing member includes a pair of restraining parts supporting so as to hold the sensor that is disposed on the arched part.

10. The sensor mounting structure according to claim 1, wherein the arched part includes three or more contact parts which come into contact with the sensor, and the three or more contact parts are disposed so that lines connecting said each contact part constitute a plane.

11. A fixing device comprising:

a fixing member, while rotating, heating a toner image on a medium;

a pressing member, while rotating, forming a nip with respect to the fixing member and then pressing the medium passing through the nip; and the sensor mounting structure according to claim 1, mounting the sensor detecting a temperature of the fixing member.

12. An image forming apparatus comprising the fixing device according to claim 11.

\* \* \* \* \*